United States Patent
Harada et al.

[11] 3,769,485
[45] Oct. 30, 1973

[54] STEEL STRAP WELDING APPARATUS FOR USE IN AN AUTOMATIC STRAPPING MACHINE

[75] Inventors: Hiroshi Harada, Kudamatsu-shi; Teruji Sakurada, Osaka-shi, both of Japan

[73] Assignees: Toyo Kohan Co., Ltd.; Toa Seiki Co., Ltd., both of Tokyo, Japan

[22] Filed: Dec. 15, 1971

[21] Appl. No.: 208,194

[52] U.S. Cl............................ 219/56, 100/4, 100/29
[51] Int. Cl...................... B23k 11/10, B65b 13/24
[58] Field of Search.......................... 219/56, 57, 58; 100/4, 29, 33

[56] References Cited
UNITED STATES PATENTS

| | | | |
|---|---|---|---|
| 3,674,972 | 7/1972 | Stahnke | 219/56 |
| 3,146,695 | 9/1964 | Van de Bilt | 100/4 |
| 3,589,275 | 6/1971 | Van de Bilt | 100/4 |
| 3,439,606 | 4/1969 | Bursik et al | 100/29 X |
| 2,614,487 | 10/1952 | Cheesman | 100/29 X |

*Primary Examiner*—R. F. Staubly
*Assistant Examiner*—Hugh D. Jaeger
*Attorney*—George B. Oujevolk

[57] ABSTRACT

In a steel strap welding apparatus for an automatic strapping machine, including a head having aligned welding, clamping and cutting stations. A support electrode is movable under overlapped strap ends to be welded simultaneously with application of clamping pressure in the clamping station. A pressure electrode is moved against the supported strap ends and thereafter the cutting station shearing means is actuated to sever the welded strap ends from the strap supply.

3 Claims, 5 Drawing Figures

INVENTORS
HIROSHI HARADA
TERUJI SAKURADA

BY GEORGE B. OUJEVOLK

ATTORNEY

INVENTORS
HIROSHI HARADA
TERUJI SAKURADA

BY GEORGE B. OUJEVOLK

ATTORNEY

STEEL STRAP WELDING APPARATUS FOR USE IN AN AUTOMATIC STRAPPING MACHINE

BACKGROUND OF THE INVENTION

The present invention relates to an automatic strap welding apparatus and more particularly, to an apparatus for the weld-fastening of a steel strap about a fragile article wherein the article to be strapped furnishes no support to the strapping or welding operation.

BRIEF REVIEW OF THE PRIOR ART

Heretofore, in strapping an article for shipment by encircling the article with a steel strap it was necessary to have a separate clamp member to clamp the superposed portion of the steel strap to the leading end. This required a separate clamping operation. If welding was attempted, the welding pressure would have to be provided by the article itself. This was acceptable when a wooden box or crate was used, but not possible in the case of a weak package, such as fiberboard boxes, paper wrapping, etc.

SUMMARY OF THE INVENTION

Thus, the present invention provides for a steel strap welding apparatus for use in an automatic strapping machine for strapping articles by winding and tightening a steel strap around the articles. The apparatus secures the portions of the strap where the leading end and the trailing portion of the steel strap superpose by welding to form a tight junction, and shearing away the excess part of the steel strap. Thus, the apparatus of this invention encircles the steel strap, which is fed out by rotating in the forward direction the steel strap feeding and tensioning mechanism around the article to be strapped. The leading end of the steel strap is positioned at the place where it superposes over the trailing portion of the steel strap. The leading end is then gripped with the steel strap-clamp mechanism while simultaneously forcing an electrode (hereinafter called the opposite electrode) which is opposite to a pressure electrode beneath the superposed portion of the steel strap. The superposed part of the steel strap supported by the opposing electrode is pressed forcibly by means of the pressure electrode, and the superposed part of the steel strap is also given a strong tension by reversely rotating the aforementioned steel strap feeding and tensioning apparatus. The strap is welded by an electric current which performs a direct spot welding function. The opposing electrode located beneath the tight steel strap is removed by the apparatus after the completion of welding, and at the same time the steel strap-clamp mechanism is opened. Shearing of the trailing excessive steel strap is then performed, finishing one cycle of the strapping operation.

As compared with similar conventional apparatuses of the prior art, the apparatus of the present invention has the following advantages:

ADVANTAGES OF THE INVENTION

A first advantage is the provision of a mechanism for supporting the heavy pressure of the pressure electrode, which gives high welding strength against strong tensioning force, i.e., the provision of an opposite electrode of the suspension type. This eliminates the drawbacks of the conventional apparatus which supports pressure by utilizing the rigidity of the articles to be strapped. In other words, the apparatus of this invention can be used for wider strapping applications by eliminating the disadvantage of the conventional apparatus which could not be applied to a rather soft article.

A second important feature is the provision of a mechanism for removing the opposite electrode by the apparatus from beneath the tight steel strap after the completion of welding, and the elimination of an extra fluidic cylinder by having the removal mechanism move with the steel strap-clamp mechanism.

The conventional apparatus does not provide a mechanism for automatically removing the opposite electrode from beneath the tight steel strap, and hence the electrode is removed as the article to be strapped is moved which, however, is a defect of the conventional apparatus delaying the strapping preparation for the next cycle in a continuously moving system. The apparatus of this invention carries out the strapping operation with the article to be strapped standing still, and therefore permits the strapping preparation for the next cycle without waiting for the article to be moved and, in addition, the system described herein permits free selection of the feeding direction of the article. Moreover, connection of the drive for removal of the opposing electrode with the steel strap-clamp mechanism, eliminating an extra fluidic cylinder makes the apparatus of this invention light and small.

Another feature of this invention is the special arrangement of the fluidic cylinders for actuating each of the mechanisms at the side of the apparatus, thus allowing the installation of a welding power transformer directly on top of the electrode.

Although it is common practice to arrange the fluidic cylinders in a direction which is coaxial with the direction of motion of the particular mechanisms, the design of a double-force mechanism for economy of space on top of the apparatus in the present invention make possible the arrangement of fluidic cylinders perpendicular to the mechanisms, resulting in the provision of the power transformer near the electrodes, thus minimizing resistance loss due to lead wires.

Additional features of this invention are the driving source of the pressure electrodes for two-point spot welding assembled by a single fluidic cylinder, effective application of the welding current by means of a direct spot welding, the provision of a strap-clamp mechanism together with a strap shearing mechanism, thus reducing weight and size of the apparatus so as to enhance the performance thereof.

The invention as well as other objects and advantages thereof will become more readily apparent from the following detailed description when taken together with the accompanying drawing in which:

DETAILED DESCRIPTION

CONSTRUCTION OF THE APPARATUS

Figure 1:
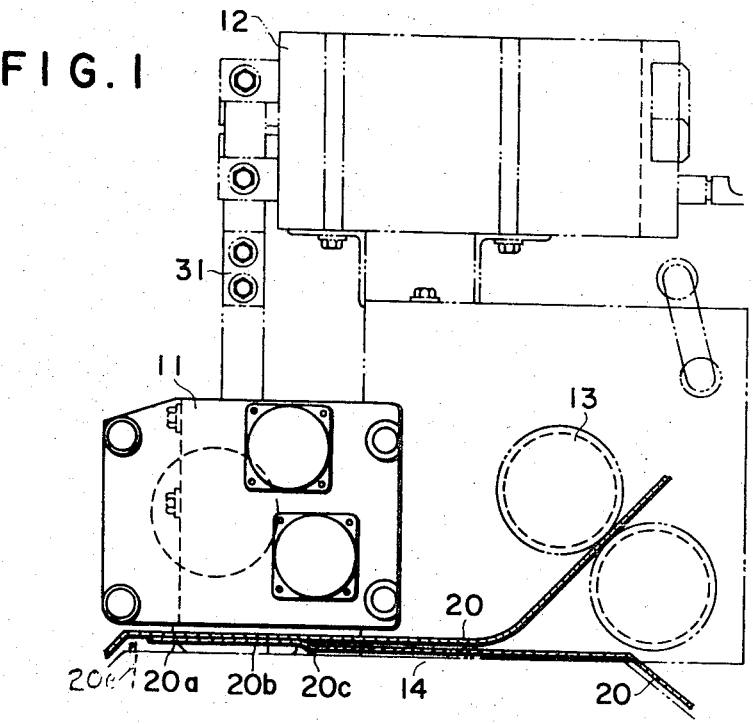
FIG. 1 is a longitudinal view of the apparatus contemplated herein showing the relative dispositon of the components used in this invention.

As shown in FIG. 1, the apparatus 11 of this invention is in the form of a welding, clamping and cutting head positioned at the spot where steel strap 20 sent by a strap feding and tensioning apparatus 13 in an automatic strapping machine superposes over leading point 20a of the steel strap which goes around the article 14 to be strapped. The welding power transformer is positioned on top of the apparatus and a lead 31 connects the apparatus and the transformer.

Figure 2:
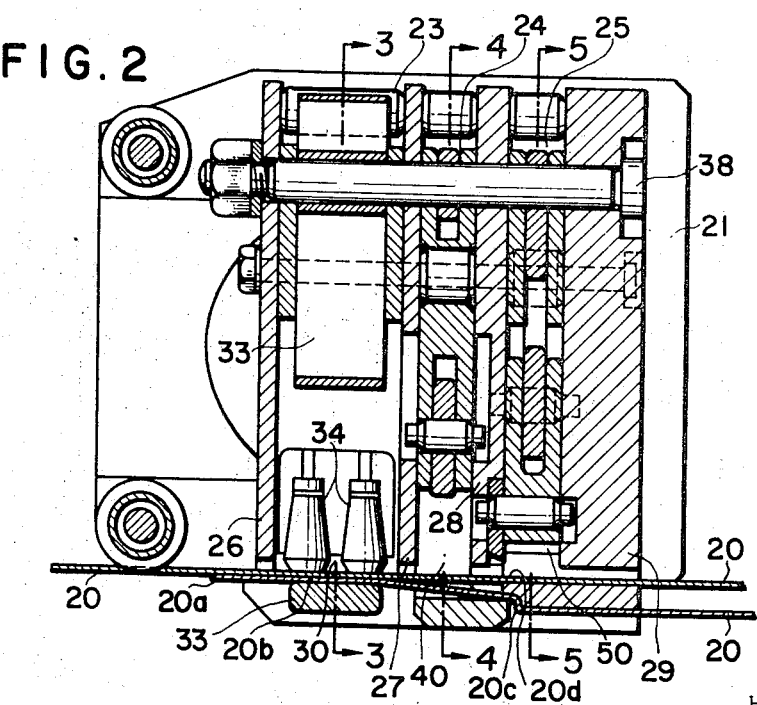
FIG. 2 is a longitudinal cross-section view of the apparatus of FIG. 1.
Figure 3:
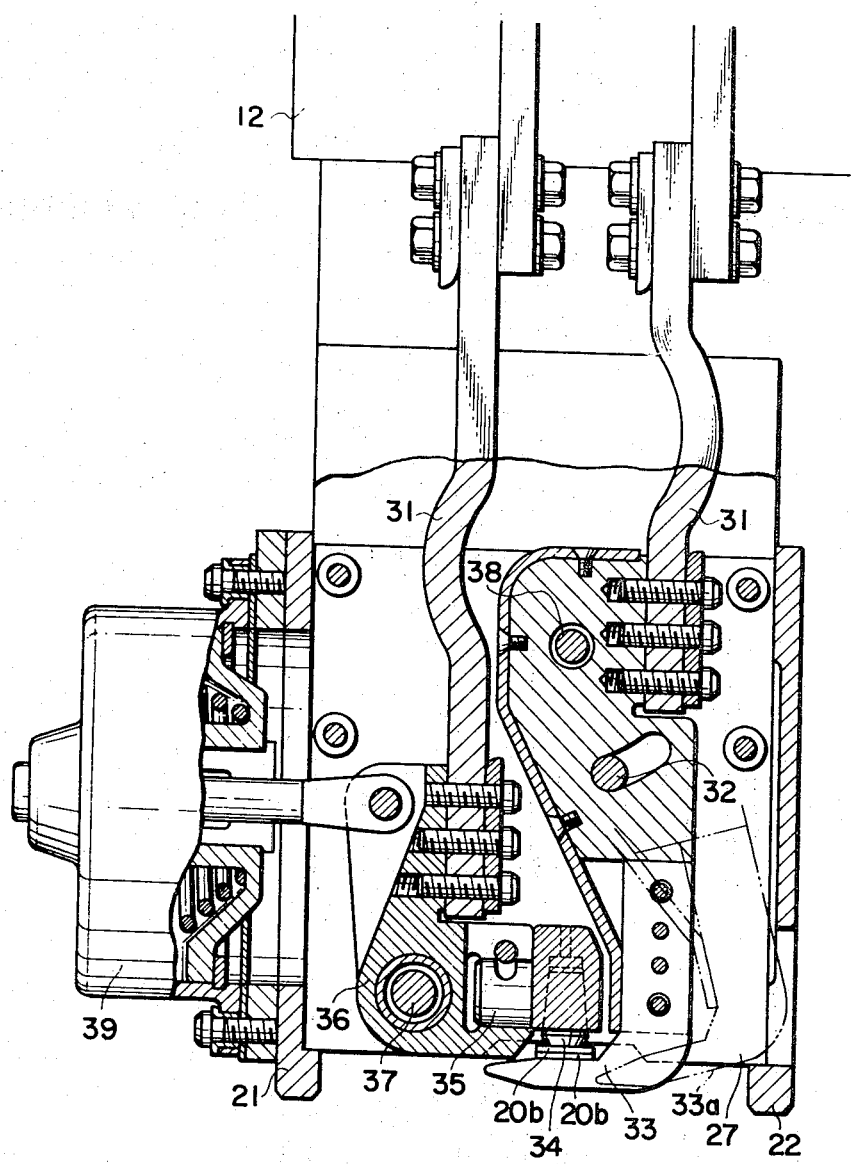
FIG. 3 is a cross-sectional view of the electrode mechanism cut along the arrow 3—3 in FIG. 2.

As shown in FIG. 2 and succeeding figures, the construction of the present apparatus includes an electrode mechanism 30, a steel strap-clamp mechamism 40 and steel strap cutting mechanism 50, respectively in individual chambers 23, 24 and 25 surrounded by cylinder plates 21, 22 and side plates 26, 27, 28 and 29. The electrode mechanism 30 is as shown in FIG. 3. The opposite or support electrode 33, of the suspension type is connected to the welding power transformer 12 by lead 31, and is movable between the positions of solid line electrode 33 and broken line electrode 33a about a supporting shaft bolt 38 serving as a pivot by means of short link pin 32 actuated by a fluidic cylinder 44. The two pressure electrode tips 34 are attached to equalizing pressure adaptor 35 which is pivotally mounted on a pressure electrode holder 36. This electrode holder 36 is pressed against the steel strap superposed portion 20b by means of a fluidic cylinder 39 with a pivoting holder pin 37 defining a pivot axis to close or open the grip on the strap. Electrode holder 36 is also connected to welder power transformer 12 by lead 31.

Figure 4:
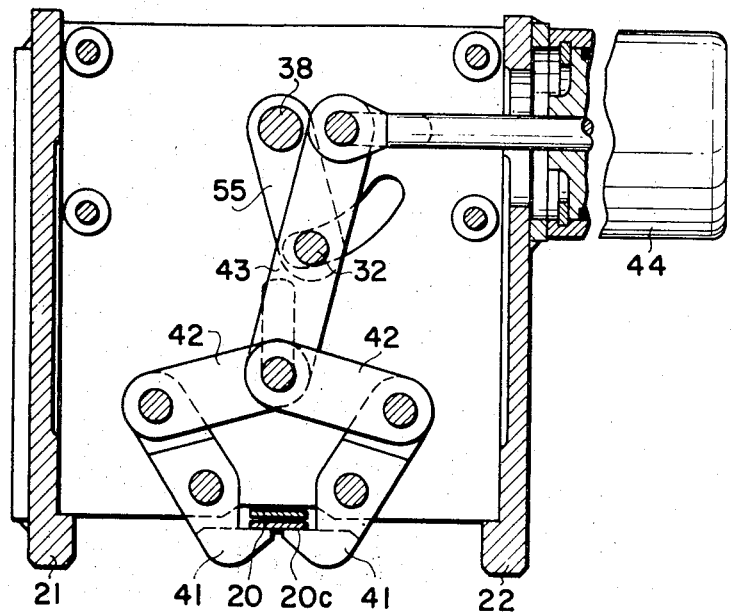
FIG. 4 is a cross-sectional view of the steel strap clamp mechanism cut along the arrow 4—4 in FIG. 2; and, FIG. 5 is a cross-sectional view showing the steel strap shearing mechanism cut along the arrow 5—5 in FIG. 2.

As shown in FIG. 4, the steel strap-clamp mechanism 40 is provided with clamps 41, holder links 42, long links 43 and fluidic cylinder 44 for clamp actuation, and short link pin 32 pivotally mounted on long link 43 actuates opposing electrodes 33 of the suspension type, cooperating with clamp mechanism 40.

Figure 5:
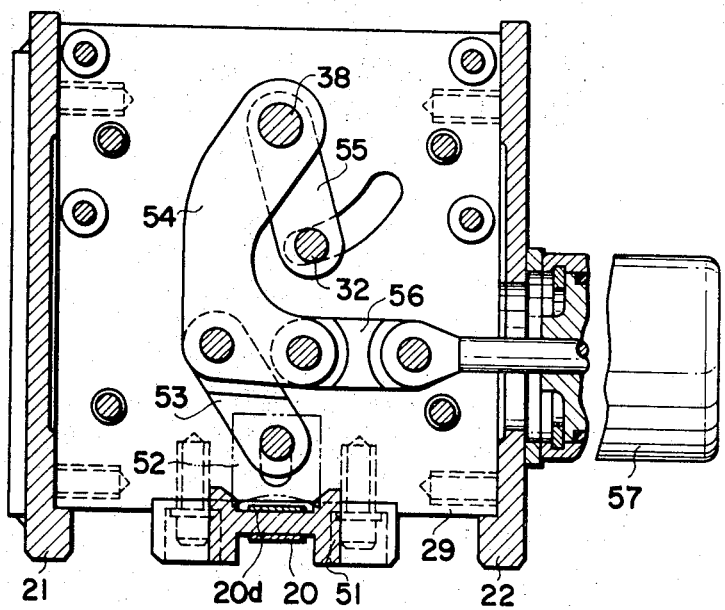

As shown in FIG. 5 in detail, the strap shearing mechanism 50 is provided with lower fixed blade 51, movable shearing blade 52, shearing pin link 53, shearing link 54, short link 55 and cylinder link 56, as well as fluidic cylinder 57 for actuation on the side of the apparatus. Short link 55 rotates in accordance with the movement of the steel strap-clamp mechanism 40 with supporting bolt 38 as an axis, and controls the movement of opposing electrode 33 which is of the suspension type.

OPERATION OF THE APPARATUS

Operation of the present apparatus starts with starting end 20a of strap 20 stopped by means of a leading end detecting mechanism 20e of the steel strap feeding and tensioning apparatus 13. That is, as clamps 41 grip and hold the steel strap leading end 20c by the operation of the fluidic cylinder 44, opposing electrode 33 which is moved by short link pin 32 is rotated simultaneously with supporting bolt 38 as a shaft, and the steel strap superposing portion 20b is forcibly inserted in the opposite direction directly under pressure electrodes 34, and is thus set.

Then, as the strap 20 is rigidly tightened around the article 14 to be strapped by means of steel strap feeding and tensioning apparatus 13, the operation of the electrode mechanism fluidic cylinder 39 causes holder 36 to rotate about shaft 37 to forcibly push down pressure electrodes 34 so that the strap superposing portion 20b may be pressed tightly between these pressure electrodes and the opposing electrode 33 in order that the electric current from welding power transformer 12 may perform spot welding to complete the junction of the steel strap superposing portion 20b to the steel strap 20.

Immediately after the completion of the welding, pressure electrodes 34 are restored upward and clamp actuating fluidic cylinder 44 which had been maintaining its operation in the pressing direction operates in the opening direction and opens clamps 41 to release the leading end 20c of the steel strap, as well as to remove opposing electrode 33 from beneath the tight strap. The shearing mechanism actuating fluidic cylinder 57 then acts to push down the movable cutting blade 52 and shears away the trailing excess strap 20d at a position adjacent to strap welding portion 20b, and then is restored to its original position.

One cycle of welding operation is thus finished. The operation of the apparatus of this invention is performed together with a series of automatic continuous operations of other various components of the automatic strapping machine by means of separately provided controllers.

It is to be observed therefore that by using the apparatus described herein with an automatic strapping machine, the following results are achieved:

1. The apparatus itself supports strong pressure by the pressure electrode without requiring rigidity of the articles to be strapped and without damage to the strapping portions of the articles, and in addition, providing very tight strapping because of the powerful tensioning force of the apparatus, and thus provides a strapping machine suitable for extensive applications.

2. The removal of the opposing electrode by the work cylinder from beneath the tight steel strap reduces the time required for one cycle of operation, and permits free selection of the travel direction of articles as well.

3. Arrangement of each fluidic cylinder on the side of the apparatus and provision of the welding power transformer directly on top of the electrodes permits reduction of capacity of the welding power transformer.

4. Simplification of mechanism such as the operation of the clamp mechanism and the opposing electrode by a single fluidic cylinder and by making the operation of the two pressure electrodes dependent upon a single fluidic cylinder, with the inclusion of the clamp and shearing mechanisms in a small unit is achieved, thus allowing the apparatus to be readily mounted on a variety of automatic strapping machines.

In addition to the above-mentioned features, one of the most important advantages of the present invention is the solution of drawbacks inherent to the conventional welding apparatus which could not provide the great advantage of fixing the steel strap by welding. Thus, a sealing material to perform strapping is not needed.

We claim:

1. A steel strap welding apparatus for welding overlapped ends of a steel strap emanating from a supply and passing about a package or the like comprising in combination a welding, clamping, and cutting head positioned directly above an overlapped strap to be welded, said head including three stations spaced longitudinally along the overlapped strap ends, a. said first station defining a welding chamber and including a support electrode located below said strap ends and mounted on a pivot axis which is above and in vertical alignment with the support electrode means to move said support electrode in and out of position beneath said axis and overlying strap ends, pressure electrode mounted above said overlapped strap ends and opposite said support electrode, means to move said pressure electrode against said strap ends to thereby tightly engage said strap ends with said support electrode, and means for applying electrical power to said electrodes, b. said second station defining a clamping chamber and including a pair of pivotally mounted clamp members beneath said overlapped strap ends, and link means connected to said clamp members and to said means to move said support electrode, whereby when said support electrode is moved into welding position beneath said overlapped strap ends, said clamp members are simultaneously moved into strap clamping position, and c. said third station defining a strap cutting chamber and located between said second chamber and said strap supply and including a fixed blade between said overlapped straps and a shearing blade located above said straps, and power means to move said shearing blade against the strap end to be severed.

2. A steel strap welding apparatus as defined in claim 1, wherein said support electrode is of L-shape adapted to receive the straps on the horizontal leg portion thereof.

3. A steel strap welding apparatus as defined in claim 1 wherein the means to move said support electrode and clamping members comprises a fluidic cylinder.

* * * * *